United States Patent
Smith et al.

(10) Patent No.: US 6,934,949 B2
(45) Date of Patent: Aug. 23, 2005

(54) METHOD, COMPUTER PROGRAM PRODUCT, AND SYSTEM FOR DUAL MODE BATCH PROGRAM EXECUTION

(75) Inventors: Alan R. Smith, Gilroy, CA (US); James C. Wright, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 10/083,065

(22) Filed: Feb. 25, 2002

(65) Prior Publication Data

US 2003/0163511 A1 Aug. 28, 2003

(51) Int. Cl.$^7$ .............................................. G06F 9/00
(52) U.S. Cl. ...................................... 718/101; 718/100
(58) Field of Search .................................. 718/100, 101

(56) References Cited

U.S. PATENT DOCUMENTS

| | | | |
|---|---|---|---|
| 5,155,678 A | 10/1992 | Fukumoto et al. | 395/425 |
| 5,530,848 A | 6/1996 | Gilbert et al. | 395/600 |
| 5,828,835 A | 10/1998 | Isfeld et al. | 395/200.3 |
| 6,154,878 A | * 11/2000 | Saboff | 717/173 |
| 6,204,847 B1 | * 3/2001 | Wright | 715/804 |
| 6,606,685 B2 | * 8/2003 | Huxoll | 711/118 |

OTHER PUBLICATIONS

IMS/ESA Version 4 Library; "Application Programming: Design Guide", Copyright International Business Machines Corporation, Third Edition, Dec. 1998.

* cited by examiner

Primary Examiner—Sue Lao
Assistant Examiner—Andy Ho
(74) Attorney, Agent, or Firm—Kunzler & Associates

(57) ABSTRACT

An IMS batch application, originally coded to execute as a DLI/DBB batch application, executes on a computer system as either a Batch Message Processing batch application or as the DLI/DBB batch application. The transfer of control to the IMS batch application is intercepted, wherein the transfer of control includes a list of PCB pointers. It is then determined if the IMS batch application is being invoked as a Batch Message Processing batch application. If the invocation is for a Batch Message Processing batch application, a modified list of PCB pointers is formed from the list of PCB pointers. The transfer of control to the IMS batch application is completed wherein the completion of the transfer of control includes passing either the modified list of PCB pointers if the IMS batch application is invoked as a Batch Message Processing batch application, or passing the unmodified list of PCB pointers if said IMS batch application is invoked as a DLI/DBB batch application.

11 Claims, 5 Drawing Sheets

LINKAGE OF A CONVERTED PL/1
APPLICATION PROGRAM 605
610 — INCLUDE SYSLMOD (PCBMOD)
615 — CHANGE PLICALLA(USERPGM)
620 — INCLUDE SYSLMOD(applpgm)
625 — ENTRY PCBMOD
    — NAME applpgm(R)

Figure 6

LINKAGE OF CONVERTED NON-PL/1
APPLICATION PROGRAM 705
710 — INCLUDE SYSLMOD(PCBMOD)
715 — CHANGE applent(USERPGM)
720 — INCLUDE SYSLMOD(applpgm)
725 — ENTRY PCBMOD
    — NAME applpgm(R)

Figure 7

METHOD, COMPUTER PROGRAM PRODUCT, AND SYSTEM FOR DUAL MODE BATCH PROGRAM EXECUTION

FIELD OF INVENTION

The present invention relates generally to the conversion of stand-alone batch applications to Batch Message Processing (BMP) batch applications. More specifically, the present invention relates to a method, program product and apparatus to assist database administrators and application program developers in converting stand-alone batch applications operating outside of an Information Management System (IMS) online environment to a BMP batch application running within an IMS environment. (IMS is a trademark of International Business Machines Corporation in the United States, other countries, or both.)

BACKGROUND

IMS is a hierarchical database management system (HDBMS) developed by International Business Machines Corporation. IMS has wide spread usage in many large enterprises where high transaction volume, reliability, availability and scalability are of the utmost importance. IMS provides software and interfaces for running the businesses of many of the world's large corporations. However, companies incorporating IMS databases into their business models typically make significant investments in IMS application programs in order to have IMS perform meaningful data processing work particularly tailored to the needs of their respective enterprises. IMS application programs are typically coded in COBOL, PL/I, C, PASCAL or assembly language. These application programs may perform IMS database functions by making Data Language One (DL/I) calls to invoke needed IMS processing.

An IMS application program may have been originally developed to run as a stand-alone batch application outside of the IMS subsystem environment. These programs are characteristically invoked by specifying either "PARM= DLI" or "PARM=DBB" on the Job Control Language (JCL) EXEC statement and are henceforth referred to as DLI/DBB batch applications. However, there are limitations placed upon applications executing in this environment. An enterprise may conclude that a particular DLI/DBB batch application needs to be converted to a BMP batch application executing under the control of an IMS subsystem to better align with changing requirements and goals. For example, program recovery procedures may be greatly simplified by changing from a DLI/DBB batch application to a BMP running under the IMS subsystem. This simplification occurs because the BMP execution environment provides for advanced logging capabilities utilizing a single system log. Furthermore, the ability to share critical IMS resources is enhanced under the IMS subsystem since resources may be locked and unlocked dynamically as required, rather than locking these resources for the entire duration of the DLI/DBB batch application.

The conversion of a DLI/DBB batch application to a BMP batch application may entail a time consuming and error prone manual conversion process to comply with all requirements of the BMP environment. Although there are some language independent techniques for coding batch applications (e.g. a specification of CMPAT=Y), there are many batch applications that are coded with language specific entry points. These programs are hard coded to expect a list of pointers, which must match exactly the list of Program Communication Blocks (PCBs) described in the Program Specification Block (PSB) in number and in order.

Therefore, this manual conversion effort frequently requires modifying the DLI/DBB batch application to accept an Input/Output Program Communication Block (IOPCB). Other conversion changes may also include increasing the number of Checkpoint calls, modifying execution JCL to conform to BMP execution requirements and generating Access Control Blocks (ACBs) from the Program Specification Blocks (PSBs). However, those applications executing with PARM=DBB do not need to generate ACBs since they already exist when operating in the DBB environment. Those of ordinary skill in the art will further recognize that references to the PSB used by a batch application must also be added to the source macros for the IMS Stage 1 Gen (or equivalent definition to the IMS Control Region) prior to execution within the BMP environment.

Many IMS enterprises delay receiving, or entirely forego, these many BMP advantages because of the extensive coding effort, discussed supra, involved with the BMP enabling conversion process. Accordingly, there is a great need for automated conversion assistance for these IMS enterprises.

SUMMARY OF THE INVENTION

To overcome the limitations in the prior art briefly described above, the present invention provides a method, computer program product, and system to facilitate the conversion of a DLI/DBB batch application to a Batch Message Processing batch application. An IMS batch application, originally coded to execute as a DLI/DBB batch application, executes on a computer system as either a Batch Message Processing batch application or as the DLI/DBB batch application. The transfer of control to the IMS batch application is intercepted, wherein the transfer of control includes a list of PCB pointers. It is then determined if the IMS batch application is being invoked as a Batch Message Processing batch application. If the invocation is for a Batch Message Processing batch application, a modified list of PCB pointers is formed from the list of PCB pointers. The transfer of control to the IMS batch application is completed wherein the completion of the transfer of control includes passing either the modified list of PCB pointers if the IMS batch application is invoked as a Batch Message Processing batch application, or passing the unmodified list of PCB pointers if said IMS batch application is invoked as a DLI/DBB batch application.

In another embodiment of the present invention, the above-described conversion method may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for executing a DLI/DBB batch application as a Batch Message Processing batch application on a computer system is also disclosed. A PCB normalizing front-end routine is linked together with the DLI/DBB batch application to form a load module. The load module is identified on a Job Control Language EXEC statement and a job comprising the Job Control Language EXEC statement is submitted for execution, wherein the DLI/DBB batch application receives control from the PCB normalizing front-end routine and executes as the Batch Message Processing batch application.

In this manner, an IMS batch application, originally coded as a DLI/DBB batch application, can be converted to execute as a BMP batch application with reduced programming time. Accordingly, the many advantages associated with BMP batch applications, briefly discussed above, may be realized on a more timely schedule and with significantly less effort and cost.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings:

FIG. 6 shows a linkage example for a converted PL/1 batch application; and

FIG. 7 shows a linkage example for a converted non-PL/1 batch application.

DETAILED DESCRIPTION

The present invention overcomes the problems associated with the prior art by teaching a system, computer program product, and method for assisting database administrators and application program developers with the conversion of DLI/DBB batch applications to BMP batch applications. Stand-alone batch applications, such as DLI/DBB batch applications, operate outside of an Information Management System (IMS) online environment, whereas BMP batch applications execute within an IMS subsystem. In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described herein. The following description is presented to enable one of ordinary skill in the art to make and use the present invention and is provided in the context of a patent application and its requirements.

Figure 1:
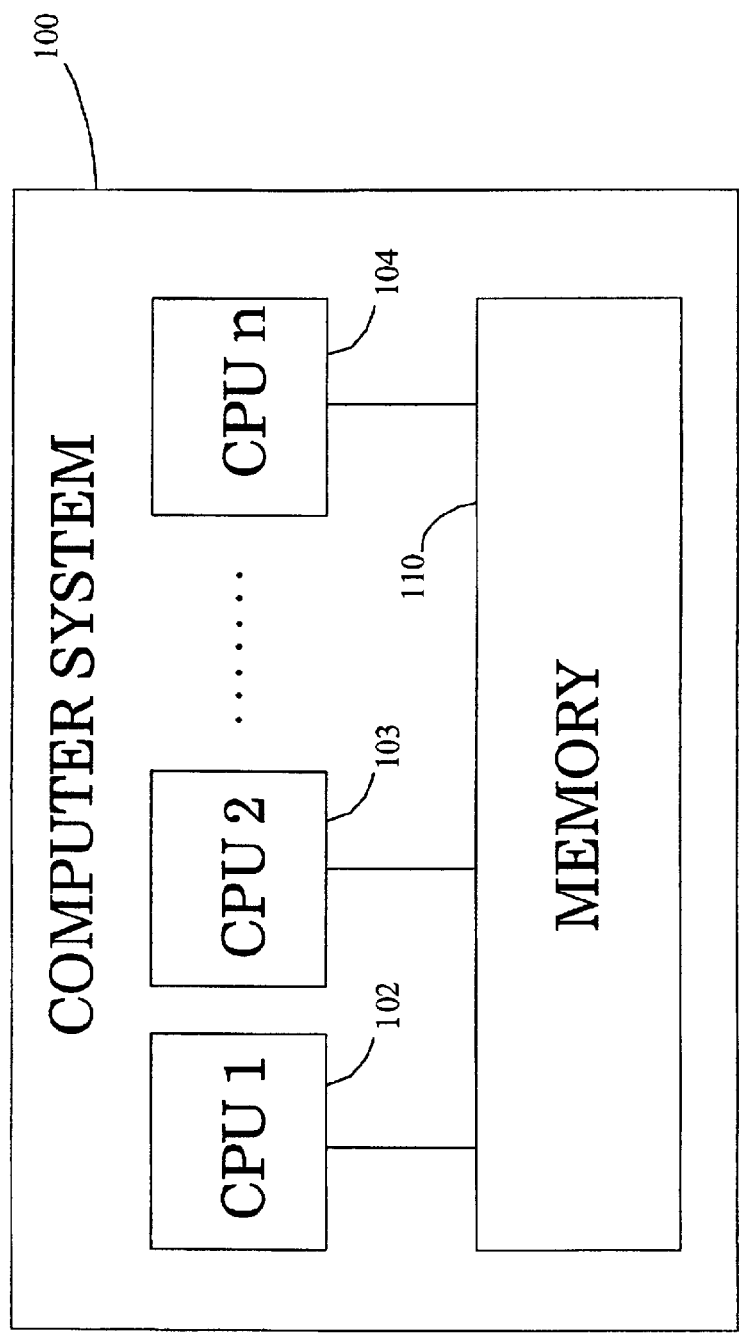
FIG. 1 is a block diagram of a typical computer system wherein the present invention may be practiced.

FIG. 1 is a block diagram of a computer system 100, such as the S/390 mainframe computer system. (S/390 is a registered trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, other components may be utilized with computer system 100, such as input/output devices comprising direct access storage devices (DASDs), printers, tapes, etc. (not shown). Although the present invention is described in a particular hardware environment, those of ordinary skill in the art will recognize and appreciate that this is meant to be illustrative and not restrictive of the present invention. Accordingly, other alternative hardware environments may be used without departing from the scope of the present invention.

Figure 2:
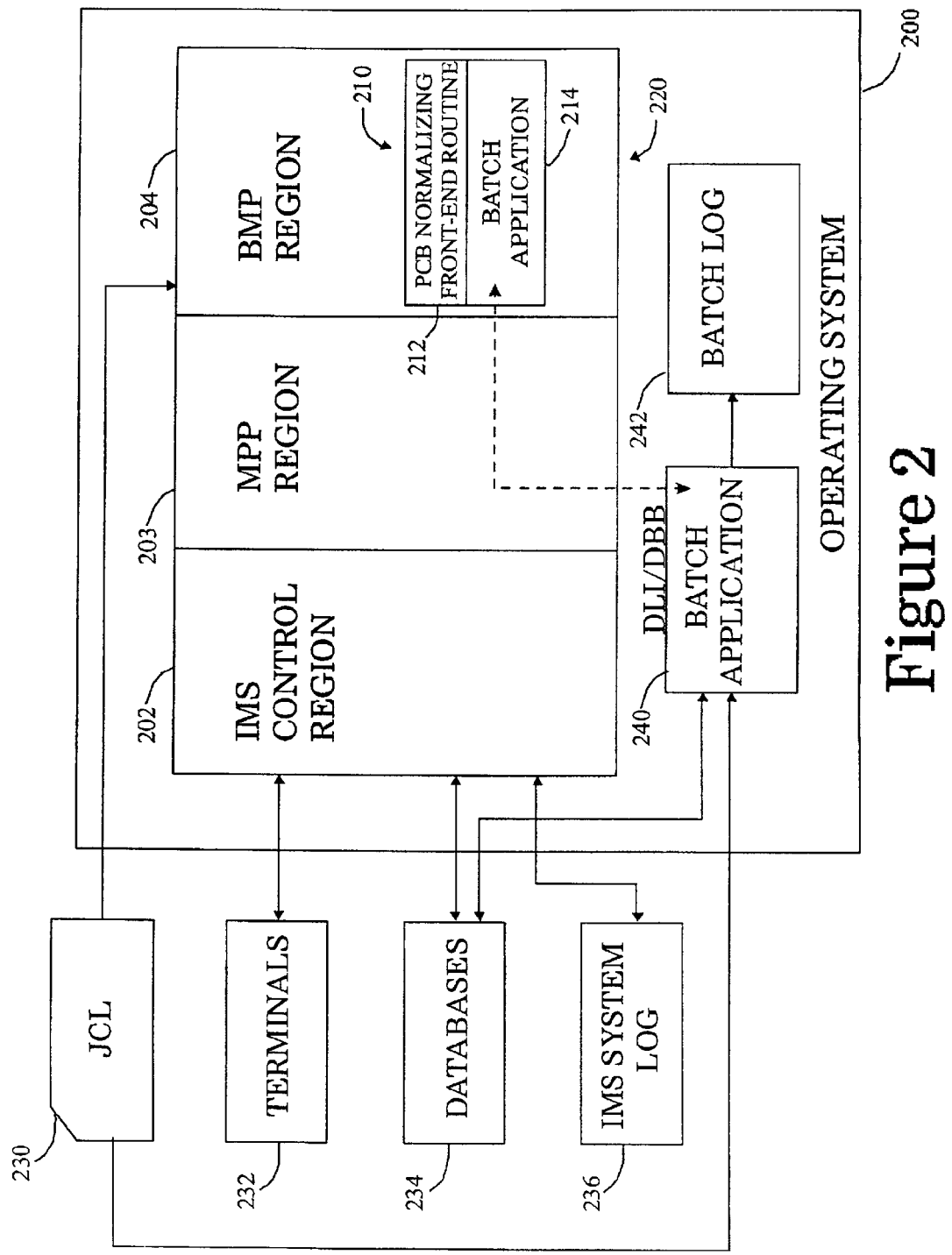
FIG. 2 is a block diagram of an exemplary IMS subsystem.

Referring now to FIG. 2, a block diagram is shown illustrating an exemplary operating system 200, such as the MVS/ESA operating system, suitable for managing the resources of computer system 100 and providing the framework for running other computing subsystems and application programs. (MVS/ESA is a trademark of International Business Machines Corporation in the United States, other countries, or both.) Subsystems functionally capable of being provided under the MVS/ESA operating system include the IMS subsystem 220. The IMS subsystem 220 comprises an IMS Control region 202, which manages the region resources comprising Message Processing Program (MPP) region 203 and BMP region 204. Other resources that communicate with, or are managed by, IMS subsystem 220 comprise terminals 232, databases 234, system log 236 and job control language (JCL) 230. Databases 234 may comprise several different types of IMS databases, such as DEDB, HDAM, HIDAM and HISAM.

DLI/DBB Batch Application 240, invoked via JCL 230, receives control from and executes under operating system 200. DLI/DBB Batch Application 240 does not use the services of IMS Subsystem 220. In this environment IMS subsystem 220 need not be present since DLI/DBB Batch Application 240 processes databases 234 directly without invoking the services of IMS Control Region 202 and utilizes a private batch log 242 in place of the IMS system log 236. However, there are limitations placed upon applications executing in this environment. An enterprise may conclude that DLI/DBB batch application 240 needs to be converted to a BMP batch application executing under the control of IMS subsystem 220 to better align with changing requirements and goals. For example, program recovery procedures may be greatly simplified by converting DLI/DBB batch application 240 to execute as BMP batch application 210 running under IMS subsystem 220. This is because BMP batch application 210 may take advantage of advanced IMS system logging capabilities utilizing system log 236. Furthermore, the ability to share critical IMS resources is enhanced under IMS subsystem 220 since resources may be locked and unlocked dynamically as required, rather than locking these resources for the entire duration of the batch application.

The process of converting DLI/DBB batch application 240 to BMP batch application 210, a time consuming and error prone manual conversion process in the prior art, is greatly simplified by the present invention by automating the re-programming of batch application 240 to accommodate an additional control block associated with the BMP execution environment.

BMP region 204 is eligible for running IMS batch applications in accordance with the present invention. BMP batch application 210 (also referred to as load module 210) executes within BMP region 204 and is formed by linking PCB normalizing front-end routine 212 with batch application 214. Batch application 214 is a second instance of DLI/DBB batch application 240. BMP batch application 210 is invoked as a BMP batch application via JCL 230 wherein PCB normalizing front-end routine 212 first receives control and performs the novel processing described infra prior to invoking batch application 214. Load module 210 may also be executed, without further modification, as a DLI/DBB batch application (not shown), thereby providing load module 210 with a "dual mode" execution capability.

Those of ordinary skill in the art will recognize that FIG. 2 is exemplary in nature and that many other IMS subsystem configurations are possible within the scope of the present invention. For example, in an alternative configuration other IMS regions, such as an Interactive Fast Path (IFP) region, could also exist.

Generally, the novel conversion methods herein disclosed may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
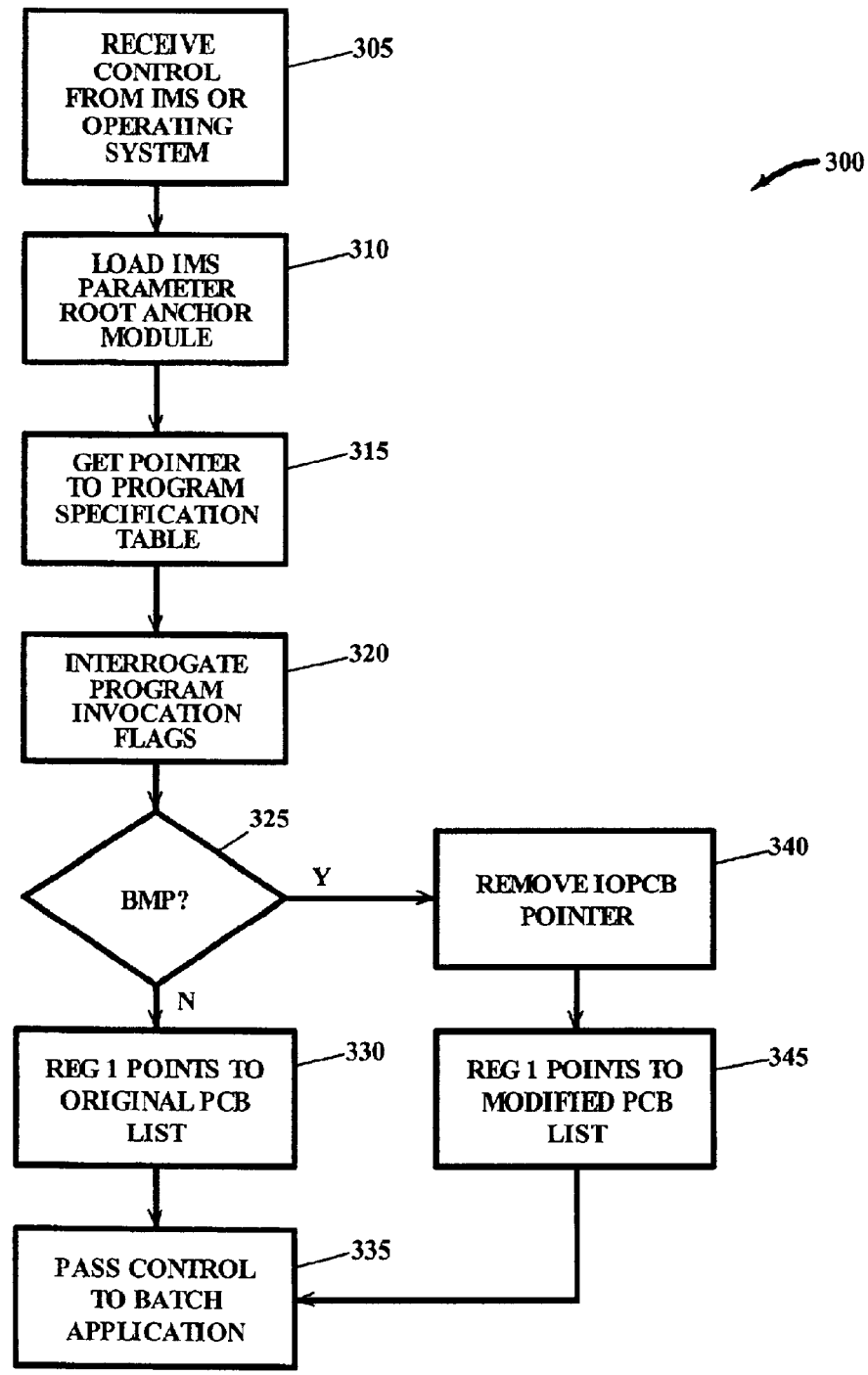
FIG. 3 is a flow diagram summarizing an exemplary PCB normalizing front-end routine.
Figure 4:
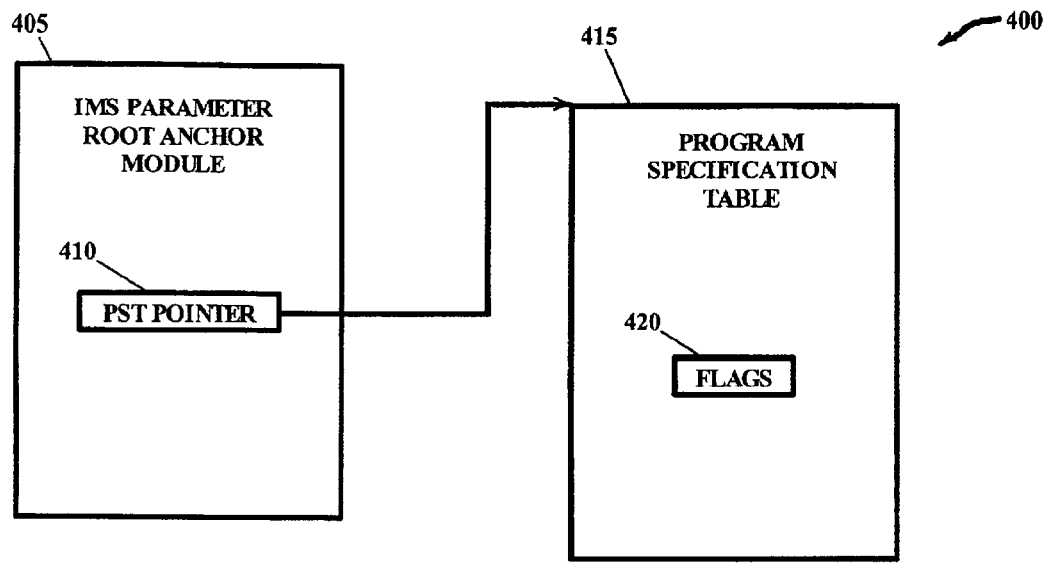
FIG. 4 is a data structure used in one embodiment of the present invention.
Figure 5:
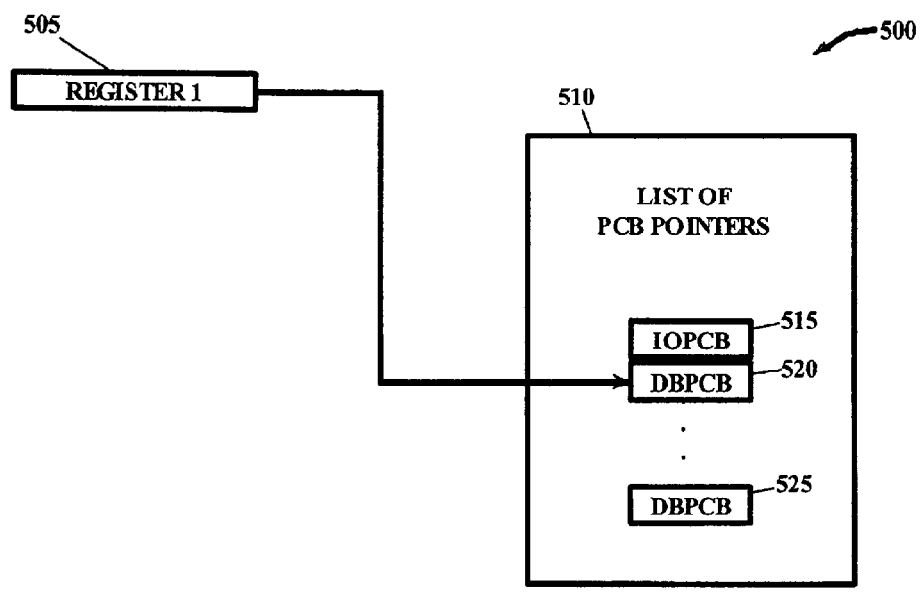
FIG. 5 is another data structure used in one embodiment of the present invention.

Referring now to FIG. 3, in conjunction with structures 200, 400 and 500 from FIGS. 2, 4 and 5, respectively, flowchart 300 illustrates the program flow of PCB normalizing front-end routine 212. In step 305, PCB normalizing front-end routine 212 receives control from IMS subsystem 220 in a BMP execution environment (as shown is FIG. 2) or from operating system 200 in a DLI/DBB environment (not shown). The PCB normalizing front-end routine 212, in step 310 performs a LOAD operation for the IMS Parameter Root Anchor Module 405. In one embodiment, module 405 is known as DFSPRPX0.

Next, in step 315, a pointer 410 to the Program Specification Table 415 is obtained. In one embodiment, pointer 410 is obtained from '14' hexadecimal offset from the beginning of Parameter Root Anchor module 405. Using the pointer obtained in step 315, in step 320, program invocation flags are interrogated. In one embodiment, these flags comprise a four-byte field known as Region Type Flags 420 and are found at 'B0' hexadecimal offset into Program Specification Table 415. Continuing with step 325, a test is made to determine if PCB normalizing front-end routine 212 was invoked within a BMP environment. In one embodiment, this is accomplished by determining if the bit, identified as '02' hexadecimal, is set to one within the first flag of Region Type Flags 420.

If load module 210 is invoked within a BMP environment, then, in step 340, IOPCB pointer 515 is removed from the list of PCB pointers 510 thereby forming a modified list of PCB pointers. Those skilled in the art will recognize that removal of IOPCB pointer 515 may be accomplished in a variety of ways. For example, in one embodiment of the present invention, DBPCB pointers 520–525 shift locations to displace IOPCB pointer 515. In another embodiment, a new list is formed comprising DBPCB pointers 520–525 wherein IOPCB pointer 515 is excluded from the list of PCB pointers. In step 345, Register 1 (reference numeral 505) is adjusted if necessary and points to the modified list of PCB pointers, comprising DBPCBs 520–525, prior to proceeding to step 335.

Returning now to step 325, if PCB normalizing front-end routine 212 was not invoked within a BMP execution environment, then, in step 330, Register 1 (reference numeral 505) is preserved with its original contents pointing to the original list of PCB pointers 515–525. In step 335, control is passed to batch application 214 which then executes within the BMP execution environment. Since no programming modifications were made to DLI/DBB batch program 240 in creating batch application 214, load module 210 can also be executed as DLI/DBB batch application 240 in a non-BMP execution environment in accordance with the needs of the enterprise. Thus, load module 210 has a dual mode characteristic enabling load module 210 to be invoked as either a BMP batch application or as a DLI/DBB batch application.

Referring now to FIG. 6, exemplary linkage control statements 600 are shown for creating load module 210 comprising PCB normalizing front-end routine 212 and a PL/1 batch application program as batch application 214. Statement 605 directs a linkage editor (not shown) to include PCB normalizing front-end routine 212 in load module 210 as "PCBMOD". Statement 610 directs a linkage editor to change the entry point into batch application 214 from the PL/1 standard entry name of PLICALLA to USERPGM. This statement simplifies the implementation of PCB normalizing front-end routine 212, in one embodiment, by providing for a fixed entry point name by which PCB normalizing front-end routine 212 transfers control to batch application 214. Statement 615 directs a linkage editor to include batch application 214 in load module 210 as "applpgm". The name "applpgm" is a name representative of any name selectable by the user for batch application 214. Statement 620 identifies PCBMOD as the external entry point for load module 210. Statement 625 identifies "applpgm" as the name of load module 210.

Referring now to FIG. 7, exemplary linkage control statements 700 are shown for creating load module 210 comprising PCB normalizing front-end routine 212 and a non-PL/1 batch application program as batch application 214. Statement 705 directs a linkage editor (not shown) to include PCB normalizing front-end routine 212 in load module 210 as "PCBMOD". Statement 710 directs a linkage editor to change the entry point into batch application 214 from any user selected entry point name, represented by the name "applent", to USERPGM. This statement simplifies the implementation of PCB normalizing front-end routine 212, in one embodiment, by providing for a fixed entry point name by which PCB normalizing front-end routine 212 transfers control to batch application 214. Statement 715 directs a linkage editor to include batch application 214 in load module 210 as "applpgm". The name "applpgm" is a name representative of any name selectable by the user for batch application 214. Statement 720 identifies PCBMOD as the external entry point for load module 210. Statement 725 identifies "applpgm" as the name of load module 210.

Taken in combination flow diagram 300 in conjunction with supporting diagrams and detailed descriptions provide for enhanced productivity by facilitating the conversion of a DLI/DBB batch application to a Batch Message Processing batch application wherein the converted entity may execute within a BMP batch execution environment or, alternatively, continue to be invoked outside the BMP execution domain. This "dual mode" conversion process provides for added execution flexibility to accommodate the dynamic needs of the enterprise.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed:

1. A method for performing on a computer system the execution of an Information Management System (IMS) batch application originally coded to execute as a DLI/DBB batch application, wherein said IMS batch application executes as either said Data Language One/Database Management Batch (DLI/DBB) batch application or as a Batch Message Processing batch application, said method comprising the steps of:
    intercepting a transfer of control to said IMS batch application, wherein said transfer of control includes a list of Program Communication Block (PCB) pointers;
    determining if said IMS batch application is invoked as said Batch Message Processing batch application, by loading an IMS Parameter Root Anchor Module, obtaining a location of a Program Specification Table using a first predetermined offset from the beginning of the IMS Parameter Root Anchor Module, and interrogating a flag at a second predetermined offset within the Program Specification Table;
    forming a modified list of PCB pointers from said list of PCB pointers if said IMS batch application is invoked as said Batch Message Processing batch application; and
    completing said transfer of control to said IMS batch application wherein said completion of said transfer of control includes passing either said modified list of PCB pointers if said IMS batch application is invoked as said Batch Message Processing batch application or passing said list of PCB pointers if said IMS batch application is invoked as said DLI/DBB batch application.

2. The method of claim 1 wherein said forming step comprises removing an Input/Output Program Communication Block (IOPCB) pointer from said list of PCB pointers.

3. The method of claim 1 wherein said completing step comprises passing said modified list of PCB pointers utilizing a Register 1.

4. The method of claim 1 wherein said intercepting step comprises linking a front-end routine together with said IMS batch application wherein said front-end routine receives control prior to invoking said IMS batch application.

5. A method for executing a Data Language One/Database Management Batch (DLI/DBB) batch application as a Batch Message Processing batch application on a computer system, comprising the steps of:
    linking a Program Communication Block (PCB) normalizing front-end routine with said DLI/DBB batch application to form a load module, said PCB normalizing front-end routine configured to determined if said IMS batch application is invoked as said Batch Message Processing batch application, by loading an IMS Parameter Root Anchor Module, obtaining a location of a Program Specification Table using a first predetermined offset from the beginning of the IMS Parameter Root Anchor Module, and interrogating a flag at a second predetermined offset within the Program Specification Table;
    identifying said load module on a Job Control Language EXEC statement; and
    submitting a job comprising said Job Control Language EXEC statement for execution, wherein said DLI/DBB batch application receives control from said PCB normalizing front-end routine and executes as said Batch Message Processing batch application.

6. A computer system for executing an IMS batch application originally coded to execute as a Data Language One/Database Management System (DLI/DBB) batch application, wherein said Information Management System (IMS) batch application executes as either said DLI/DBB batch application or as a Batch Message Processing batch application, said computer system comprising:
    a computer;
    first computer program instructions for intercepting a transfer of execution control from a sofware program to said IMS batch application, wherein said transfer of control includes a list of Program Communication Block (PCB) pointers;
    second computer program instructions for determining if said IMS batch application is invoked as said Batch Message Processing batch application, by loading an IMS Parameter Root Anchor Module, obtaining a location of a Program Specification Table using a first predetermined offset from the beginning of the IMS Parameter Root Anchor Module, and interrogating a flag at a second predetermined offset within the Program Specification Table;
    third computer program instructions for forming a modified list of PCB pointers from said list of PCB pointers if said IMS batch application is invoked as said Batch Message Processing batch application; and
    fourth computer program instructions for completing said transfer of control to said IMS batch application wherein said completion of said transfer of control includes passing either said modified list of PCB pointers if said IMS batch application is invoked as said Batch Message Processing batch application or passing said list of PCB pointers if said IMS batch application is invoked as said DLI/DBB batch application.

7. The system of claim 6 wherein said third computer program instructions comprise instructions for removing an Input/Output Program Communication Block (IOPCB) pointer from said list of PCB pointers.

8. The system of claim 6 wherein said fourth computer program instructions comprise instructions for passing said modified list of PCB pointers utilizing a Register 1.

9. An article of manufacture for use in a computer system tangibly embodying computer instructions executable by said computer system to perform process steps for executing an Information Management System (IMS) batch application originally coded to execute as a Database Language One/Database Management Batch (DLI/DBB) batch application, wherein said IMS batch application executes as either said DLI/DBB batch application or as a Batch Message Processing batch application, said process steps comprising:

intercepting a transfer of execution control from a software program to said IMS batch application, wherein said transfer of control includes a list of Program Communication Block (PCB) pointers;

determining if said IMS batch application is invoked as said Batch Message Processing batch application, by loading an IMS Parameter Root Anchor Module, obtaining a location of a Program Specification Table using a first predetermined offset from the beginning of the IMS Parameter Root Anchor Module, and interrogating a flag at a second predetermined offset within the Program Specification Table;

forming a modified list of PCB pointers from said list of PCB pointers if said IMS batch application is invoked as said Batch Message Processing batch application; and completing said transfer of control to said IMS batch application wherein said completion of said transfer of control includes passing either said modified list of PCB pointers if said IMS batch application is invoked as said Batch Message Processing batch application or passing said list of PCB pointers if said IMS batch application is invoked as said DLI/DBB batch application.

10. The article of manufacture according to claim 9 wherein said forming step comprises removing an Input/Output Program Communication Block (IOPCB) pointer from said list of PCB pointers.

11. The article of manufacture according to claim 9 wherein said completing step comprises passing said modified list of PCB pointers utilizing a Register 1.

* * * * *